No. 799,968. PATENTED SEPT. 19, 1905.
H. J. BLÄSKE.
BORING DRILL.
APPLICATION FILED JULY 25, 1905.
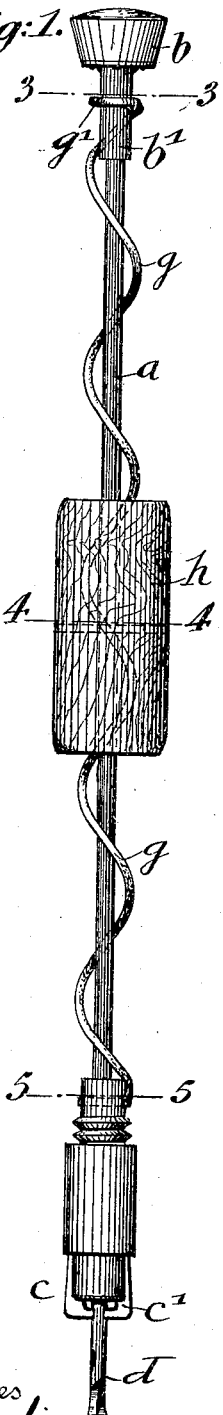
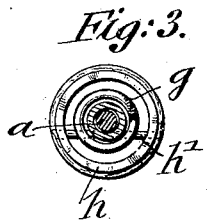
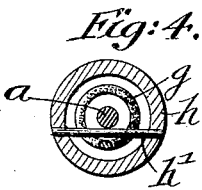
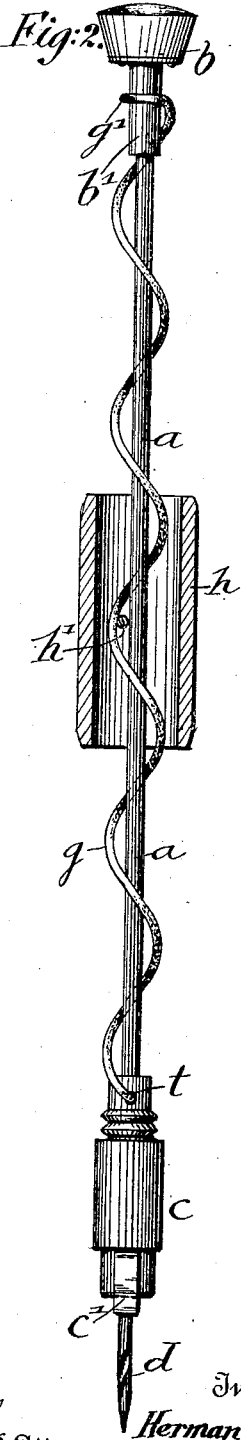
Witnesses
Inventor
Herman J. Bläske
By his Attorneys

UNITED STATES PATENT OFFICE.

HERMAN J. BLÄSKE, OF NEWBURGH, NEW YORK.

BORING-DRILL.

No. 799,968. Specification of Letters Patent. Patented Sept. 19, 1905.

Application filed July 25, 1905. Serial No. 271,244.

*To all whom it may concern:*

Be it known that I, HERMAN J. BLÄSKE, a citizen of the United States, residing in Newburgh, in the county of Orange and State of New York, have invented certain new and useful Improvements in Boring-Drills, of which the following is a specification.

This invention relates to an improvement in boring-drills, and more especially in that class of drills known as "breast-drills," the improvements being designed with the view of permitting the cutting of the bit in both directions when the handle of the drill is moved forward, as well as when it is moved backward; and for this purpose the invention consists of a boring-drill comprising a spindle, a chuck at the end of the spindle for holding the bit, a breastplate swiveled to the opposite end of the spindle, a helical wire attached to the breastplate and chuck, and a hollow handle provided with a transverse pin which passes through the space between the spindle and helical guide-wire, so as to produce the rotation of the spindle first in one and then in the opposite direction as the handle is moved forward and backward over the spindle and guide-wire.

In the accompanying drawings, Figure 1 is a side elevation of my improved boring-drill. Fig. 2 is also a side elevation, partly in section, through the operating-handle; and Figs. 3, 4, and 5 are detail horizontal sections respectively on lines 3 3, 4 4, and 5 5, Fig. 1.

Similar letters of reference indicate corresponding parts in the different figures of the drawings.

Referring to the drawings, $a$ represents the spindle of my improved boring-drill. The spindle $a$ is provided at one end with a breastplate or button $b$, having a sleeve $b'$, in which the end of the spindle is swiveled. To the opposite end of the spindle is applied a chuck $c$, which carries a bit $d$, that is retained in position by the jaws $c'$ of the chuck. The chuck $c$ is made of any approved construction. Around the spindle is arranged a helical guide $g$, which is preferably made of stout wire, connected by means of a ring-shaped turner $g'$ at one end with the sleeve $b'$, attached to the breastplate $b$, so as to turn freely thereon, while the opposite end is bent at an angle and passed through a transverse socket $t$ at the upper end of the chuck $c$ and through a hole in the spindle, as shown in Fig. 5. A tubular or sleeve-shaped handle $h$, provided with a transverse pin $h'$, passing through the space between the spindle $a$ and helical guide $g$, is adapted to move forward and backward, so that the forward motion of the handle, by means of the transverse pin $h'$, helical guide $g$, and spindle $a$, produces the turning of the chuck and bit in one direction together with the handle, while the return motion of the handle $h$ produces the turning of the chuck, bit, and spindle in the opposite direction, so as to impart a rotary motion and produce thereby the cutting motion of the bit by the forward and backward motion of the handle.

In using my improved boring-drill the breastplate is placed against the chest and the handle moved forward and backward, so that both arms may be used for working the bit, while the pressure of the chest on the breastplate produces the forward motion of the bit into the hole to be drilled. As the bit cuts in both directions by the rotary motion imparted to the same by the reciprocating motion of the handle, a very quick action is obtained.

The drill can be used for boring holes in wood or metal.

Having thus described my invention, I claim as new and desire to secure by Letters Patent—

1. A boring-drill comprising a spindle, a breastplate at one end of the same, a chuck at the opposite end of the spindle provided with a bit, a helical guide-wire attached at one end movably to the sleeve or socket of the breastplate and connected at the opposite end to the chuck and spindle, and a tubular handle placed over the spindle and guide-wire and provided with a transverse pin passing between the same.

2. A boring-drill consisting of a spindle, a breastplate provided with a socket or sleeve into which one end of the spindle is swiveled, a chuck provided with a bit attached to the opposite end of the spindle, a guide-wire extending spirally around the spindle and being rotatably guided by one end on the socket or sleeve of the breastplate and connected with the chuck and spindle at its opposite end, and a handle extending over the spindle and guide-wire and provided with a pin passing between the same.

In testimony that I claim the foregoing as my invention I have signed my name in presence of two subscribing witnesses.

HERMAN J. BLÄSKE.

Witnesses:
PAUL GOEPEL,
HENRY J. SUHRBIER.